US008150031B2

(12) United States Patent  
Gueron

(10) Patent No.: US 8,150,031 B2  
(45) Date of Patent: Apr. 3, 2012

(54) METHOD AND APPARATUS TO PERFORM REDUNDANT ARRAY OF INDEPENDENT DISKS (RAID) OPERATIONS

(75) Inventor: Shay Gueron, Haifa (IL)

(73) Assignee: Intel Corporation, Santa Clara, CA (US)

( * ) Notice: Subject to any disclaimer, the term of this patent is extended or adjusted under 35 U.S.C. 154(b) by 733 days.

(21) Appl. No.: 12/317,082

(22) Filed: Dec. 19, 2008

(65) Prior Publication Data

US 2010/0158241 A1 Jun. 24, 2010

(51) Int. Cl.
*H04L 9/06* (2006.01)
(52) U.S. Cl. ........................................ 380/28
(58) Field of Classification Search ............... 380/28
See application file for complete search history.

(56) References Cited

U.S. PATENT DOCUMENTS

| | | | |
|---|---|---|---|
| 7,895,253 B2 * | 2/2011 | Stein et al. ............. | 708/492 |
| 2007/0033244 A1 * | 2/2007 | Cohen et al. ............ | 708/404 |
| 2007/0189536 A1 * | 8/2007 | Gammel et al. .......... | 380/259 |
| 2008/0101607 A1 * | 5/2008 | Liang et al. ............. | 380/260 |
| 2008/0162806 A1 | 7/2008 | Gopal et al. | |
| 2008/0177815 A1 | 7/2008 | Ito | |
| 2008/0184067 A1 | 7/2008 | Ito | |
| 2009/0220071 A1 | 9/2009 | Gueron et al. | |

FOREIGN PATENT DOCUMENTS

| WO | 2010/080263 A2 | 7/2010 |
|---|---|---|
| WO | 2010/080263 A3 | 9/2010 |

OTHER PUBLICATIONS

Tillich et al. (Stefan Tillich and Christoph Herbst, "Boosting AES Performance on a Tiny Processor Core", CT-RSA'08 Proceedings of the 2008 The Cryptopgraphers' Track at the RSA conference on Topics in cryptology, May 2008).*
Gueron et al. (Shay Gueron and Michael E. Kounavis, "Vortex A New Family of One-Way Hash Functions Based on AES Rounds and Carry-less Multiplication", Information Securtiy Conference (ISC) 2008, Sep. 2008).*
Office Action received for European Patent Application No. 09837806.0, mailed on Jul. 27, 2011, 2 pages of Office Action.
International Preliminary Report on Patentability received for PCT Patent Application No. PCT/US2009/066717, mailed on Jun. 30, 2011, 5 pages.
International Search Report and Written Opinion received for PCT Application No. PCT/US2009/066717, mailed on Jun. 28, 2010, 10 pages.

* cited by examiner

*Primary Examiner* — Peter Poltorak
(74) *Attorney, Agent, or Firm* — Caroline M. Fleming

(57) ABSTRACT

A method and apparatus to compute a Q syndrome for RAID 6 through the use of AES operations is provided. In an embodiment, the result of GF multiplication performed using the AES operations allows RAID-6 support to be provided without the need for a dedicated RAID controller.

20 Claims, 10 Drawing Sheets

```
void RAID6_by_4 ( )
__asm {

;      movdqu xmm15, XMMWORD PTR mask3   ;// copy mask3 into register
;      movdqu xmm14, XMMWORD PTR mask2   ;// copy mask2 into register
;      movdqu xmm13, XMMWORD PTR mask1   ;// copy mask1 into register
;      movdqu xmm12, XMMWORD PTR zero_   ;// copy zero_ into register mov rdx, OFFSET DATA
       mov rbx, OFFSET RES mov ecx, DWORD PTR [CHUNKS_of_4]
  START_OVER_LABEL:
```

```
movdqu xmm0, XMMWORD PTR [rdx]; copy the data into register
vpshufb xmm1, xmm0, mask1; zero the bytes in odd positions         600 movdqu xmm3, XMMWORD PTR [rdx+0x10]; copy the data into register
vpshufb xmm4, xmm3, mask1; zero the bytes in odd positions movdqu xmm6, XMMWORD PTR [rdx+0x20]; copy the data into register
vpshufb xmm7, xmm6, mask1; zero the bytes in odd positions movdqu xmm9, XMMWORD PTR [rdx+0x30]; copy the data into register
vpshufb xmm10, xmm9, mask1; zero the bytes in odd positions
```

```
AESDECLAST xmm1, zero_ ; AES instructions with round key = 0
AESDECLAST xmm4, zero_; AES instructions with round key = 0      602
AESDECLAST xmm7, zero_; AES instructions with round key = 0
AESDECLAST xmm10, zero_ ; AES instructions with round key = 0
```

```
vpshufb xmm2, xmm0, mask2; zero the bytes in even positions              604
pshufb xmm0, mask3; shuffling the original data with mask3 (re-ordering the bytes)

vpshufb xmm5, xmm3, mask2; zero the bytes in even positions
pshufb xmm3, mask3; shuffling the original data with mask3 (re-ordering the bytes)
```

FIG. 6A

```
AESENC xmm1, zero_      ; AES instructions with round key = 0 ? get MixColumns
                                                                                  606
AESENC xmm4, zero_      ; AES instructions with round key = 0 ? get MixColumns AESENC xmm7, zero_      ; AES instructions with round key = 0 ? get MixColumns AESENC xmm10, zero_     ; AES instructions with round key = 0 ? get MixColumns
```

```
vpshufb xmm8, xmm6, mask2      ; zero the bytes in even positions              608
pshufb xmm6, mask3       ; shuffling the original data with mask3 (re-ordering the bytes)
vpshufb xmm11, xmm9, mask2     ; zero the bytes in even positions
pshufb xmm9, mask3       ; shuffling the original data with mask3 (re-ordering the bytes)
```

```
AESDECLAST xmm2, zero_                                                          610
AESDECLAST xmm5, zero_
AESDECLAST xmm8, zero_
AESDECLAST xmm11, zero_
```

```
PSHUFB xmm1, mask1      ; again - zero the bytes in odd byte positions         612
PSHUFB xmm4, mask1      ; again - zero the bytes in odd byte positions
PSHUFB xmm7, mask1      ; again - zero the bytes in odd byte positions
PSHUFB xmm10, mask1     ; again - zero the bytes in odd byte positions
```

```
AESENC xmm2, zero_
PSHUFB xmm2, mask2      ; again - zero the bytes in even byte positions        614

AESENC xmm5, zero_
PSHUFB xmm5, mask2      ; again - zero the bytes in even byte positions AESENC xmm8, zero_
PSHUFB xmm8, mask2      ; again - zero the bytes in even byte positions AESENC xmm11, zero_
PSHUFB xmm11, mask2     ; again - zero the bytes in even byte positions
```

FIG. 6B

```
PXOR xmm2, xmm1        ; xmm2 = xmm2 xor xmm1                                616
PXOR xmm0, xmm2        ; xmm0 = xmm0 xor xmm2 = xmm0 + xmm2 + xmm1

PXOR xmm5, xmm4        ; xmm5 = xmm5 xor xmm4
PXOR xmm3, xmm5        ; xmm3 = xmm3 xor xmm5 = xmm3 + xmm5 + xmm4

PXOR xmm8, xmm7        ; xmm8 = xmm8 xor xmm7
PXOR xmm6, xmm8        ; xmm6 = xmm6 xor xmm8 = xmm6 + xmm8 + xmm7

PXOR xmm11, xmm10      ; xmm11 = xmm11 xor xmm10
PXOR xmm9, xmm11       ; xmm9 = xmm9 xor xmm11 = xmm9 + xmm11 + xmm10
```

```
movdqu XMMWORD PTR [rbx], xmm0                                               618
movdqu XMMWORD PTR [rbx+0x10], xmm3
movdqu XMMWORD PTR [rbx+0x20], xmm6
movdqu XMMWORD PTR [rbx+0x30], xmm9
```

```
        add rdx, 0x40                                                        620
        add rbx, 0x40
add ecx, -1
jnz START_OVER_LABEL
```

}

FIG. 6C

# METHOD AND APPARATUS TO PERFORM REDUNDANT ARRAY OF INDEPENDENT DISKS (RAID) OPERATIONS

FIELD

This disclosure relates to Redundant Array of Independent Disks (RAID) and in particular to a level 6 RAID.

BACKGROUND

A Redundant Array of Independent Disks (RAID) combines a plurality of physical hard disk drives into a logical drive for purposes of reliability, capacity, or performance. Thus, instead of multiple physical hard disk drives, an operating system sees the single logical drive. As is well known to those skilled in the art, there are many standard methods referred to as RAID levels for distributing data across the physical hard disk drives in a RAID system.

For example, in a level 0 RAID system the data is striped across a physical array of hard disk drives by breaking the data into blocks and writing each block to a separate hard disk drive. Input/Output (I/O) performance is improved by spreading the load across many hard disk drives. Although a level 0 RAID improves I/O performance, it does not provide redundancy because if one hard disk drive fails, all of the data is lost A level 5 RAID system provides a high level of redundancy by striping both data and parity information across at least three hard disk drives. Data striping is combined with distributed parity to provide a recovery path in case of failure.

A level 6 RAID (RAID-6) system provides an even higher level of redundancy than a level 5 RAID system by allowing recovery from two disk failures. In a level 6 RAID system, two syndromes referred to as the P syndrome and the Q syndrome are generated for the data and stored on hard disk drives in the RAID system.

The P syndrome is generated by computing parity information for the data in a stripe (data blocks (strips), P syndrome block and Q syndrome block). The generation of the Q syndrome requires Galois Field multiplications and is complex in the event of a disk drive failure. Computations in the Galois Field (Finite Field) $GF(2^8)$ are defined via the reduction polynomial $x^8+x^4+x^3+x+1$ (that is, 11B (in hexadecimal notation)).

The regeneration scheme to recover data and/or P and/or Q syndromes performed during disk recovery operations requires both Galois Field multiplication and inverse operations.

For example, in a RAID array with n data disks D0, D1, D2, . . . Dn−1, (n≦255), two quantities, namely parity (P), and Reed-Solomon code (Q), are needed in order to recover from the loss of 2 disks.

P and Q are defined by:

$$P = D_0 + D_1 + D_2 + \ldots + D_{n-1}$$

$$Q = g^0 \cdot D_0 + g^1 \cdot D_1 + g^2 \cdot D_2 + \ldots + g^{n-1} \cdot D_{n-1}$$

where g={02} is an element in the Galois Field (Finite Field) $GF(2^8)$, and '+' and '−' are the operations in this field.

The computational bottleneck associated with the RAID-6 system is the cost of computing Q. The difficulty stems from the fact that traditional processors (Central Processing Units (CPU)s) have poor performance with computations in the Galois Field (Finite Field) $GF(2^8)$. Thus, typically in order to increase performance, table lookup based algorithms are used. The use of table lookups results in an inherently slow serial process.

BRIEF DESCRIPTION OF THE DRAWINGS

Features of embodiments of the claimed subject matter will become apparent as the following detailed description proceeds, and upon reference to the drawings, in which like numerals depict like parts, and in which:

FIGS. 6A-6C is sample code that allows Galois Field multiplication to be performed concurrently on a plurality of 16 byte data blocks.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
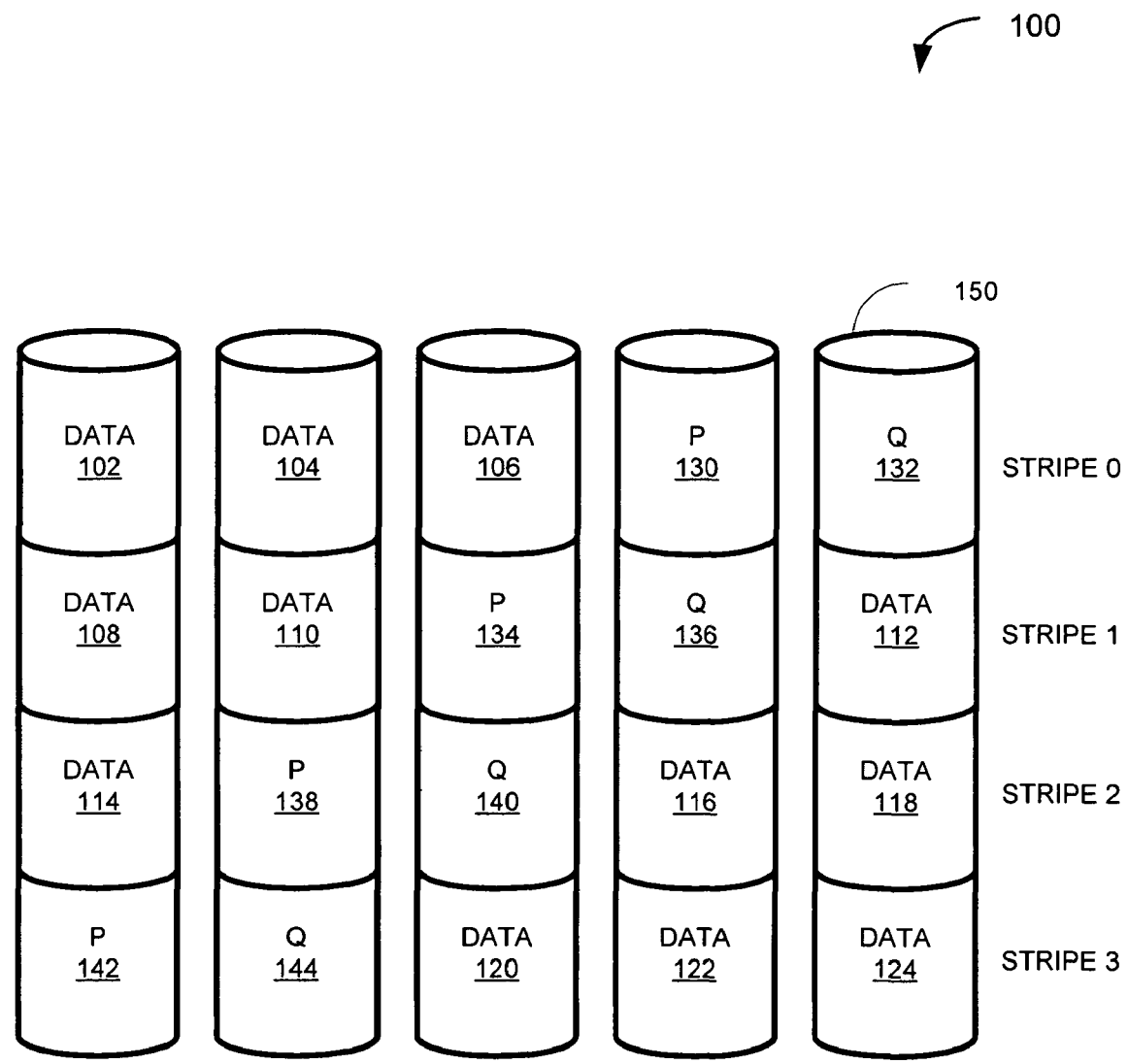
FIG. 1 is a block diagram illustrating an embodiment of a RAID-6 array showing a plurality of stripes with each stripe including data blocks (strips) and P and Q syndromes striped across an array of hard disks.

FIG. 1 is a block diagram illustrating an embodiment of a RAID-6 array 100 showing a plurality of stripes with each stripe including data blocks (strips) and P and Q syndromes striped across an array of hard disks 150. In the embodiment shown, the RAID array 100 has five hard disks 150. Data is written to the RAID-6 array using block-level striping with P and Q syndromes distributed across the member hard disks in a round robin fashion. Sequential data, for example, a file segmented into blocks may be distributed across a stripe, for example, horizontal stripe 0, with one of the blocks stored in data blocks 102, 104, 106 on three of the data disks 150. In one embodiment, there are 512 bytes in each block in a stripe.

A P and a Q syndrome computed for the data blocks 102, 104, 106 in horizontal stripe 0 are stored in a respective P block 130 and Q block 132 in stripe 0. P and Q syndrome blocks are stored on different hard disks 150 in each stripe.

The P syndrome may be generated by performing an exclusive OR (XOR) operation. XOR is a logical operation on two operands that results in a logical value of '1', if only one of the operands has a logical value of '1'. For example, the XOR of a first operand having a value '11001010' and a second operand having a value '10000011' provides a result having a value '01001001'. If the hard drive that stores the first operand fails, the first operand may be recovered by performing an XOR operation on the second operand and the result.

The P syndrome is the simple parity of data (D) computed across a stripe using e) (XOR) operations. In a system with n data disks, the generation of the P syndrome is represented by equation 1 below:

$$P = D_0 \oplus D_1 \oplus D_2 \ldots \oplus D_{n-1} \qquad \text{(Equation 1)}$$

The computation of the Q syndrome requires multiplication (·) using a Galois Field polynomial (g). Arithmetic operations are performed on 8-bit (byte) Galois-field polynomials at very high performance. A polynomial is an expression in which a finite number of constants and variables are combined using only addition, subtraction, multiplication and non-negative whole number exponents. One primitive polynomial is $x^8+x^4+x^3+x^2+1$. The Galois Field (GF) operations on polynomials are also referred to as $GF(2^8)$ arithmetic. In a system with n data disks, the generation of the Q syndrome is represented by equation 2 below:

$$Q = g^0 \cdot D_0 \oplus g^1 \cdot D_1 \oplus g^2 \cdot D_2 \ldots \oplus g^{n-1} \cdot D_{n-1} \quad \text{(Equation 2)}$$

Byte-wise Galois Field operations are performed on a stripe basis, where each byte in the block is computationally independent from the other bytes. Byte-wise Galois Field operations can accommodate as many as 255 ($2^8-1$) data disks.

Performance of the generation of the Q syndrome may be improved by expressing Q in its Horner representation, as represented by Equation 3 below:

$$Q = ((\ldots D_{n-1} \ldots) \cdot g \oplus D_2) \cdot g \oplus D_1) \cdot g \oplus D_0 \quad \text{(Equation 3)}$$

Thus, two operations are used to compute Q:
(1) XOR $\oplus$ and
(2) multiplication by g={02}(·).

In contrast to the computation shown in Equation 2, the computation in Equation 3 does not require general multiplication in GF256. Instead, the multiplication is by g {02}. For a single byte, multiplication by g={02} can be performed by shifting the value left by one bit. A conditional Exclusive OR (XOR) operation is then performed on the result of the multiplication and another value based on the state of Most Significant Bit in the result. To compute four bytes at a time, in parallel, the multiplication by {02} is performed by shifting the value stored in the four bytes left by one bit and then performing four conditional XOR operations, one per byte as shown below:

uint32_t v, vv;
vv=(v<<1) & 0xfefefefe;
vv^=((v & 0x00000080)?0x0000001d:0)+
((v & 0x00008000)?0x00001d00:0)+
((v & 0x00800000)?0x001d0000:0)+
((v & 0x80000000)?0x1d000000:0);

The "& 0xfefefefe" is a mask to avoid undesired carries. However, the conditional XORs) operations are not very efficient. The computation time may be decreased by operating on 8 bytes in parallel instead of 4 bytes, and by using a mask based on the Most Significant bit (MSB) in each of the 8 bytes.

The computation of the Q syndrome for the RAID-6 algorithm uses the same representation of $GF(2^8)$ that is used for the Advanced Encryption Standard (AES), published by the National Institute of Standards and Technology (NIST) as Federal Information Processing Standard (FIPS) 197. AES is a symmetric block cipher that can encrypt and decrypt information.

In an embodiment, AES instructions that use $GF(2^8)$ are used to perform the Galois Field multiplication operations to compute the Q syndrome required for RAID level 6 according to the principles of the present invention.

Figure 2:
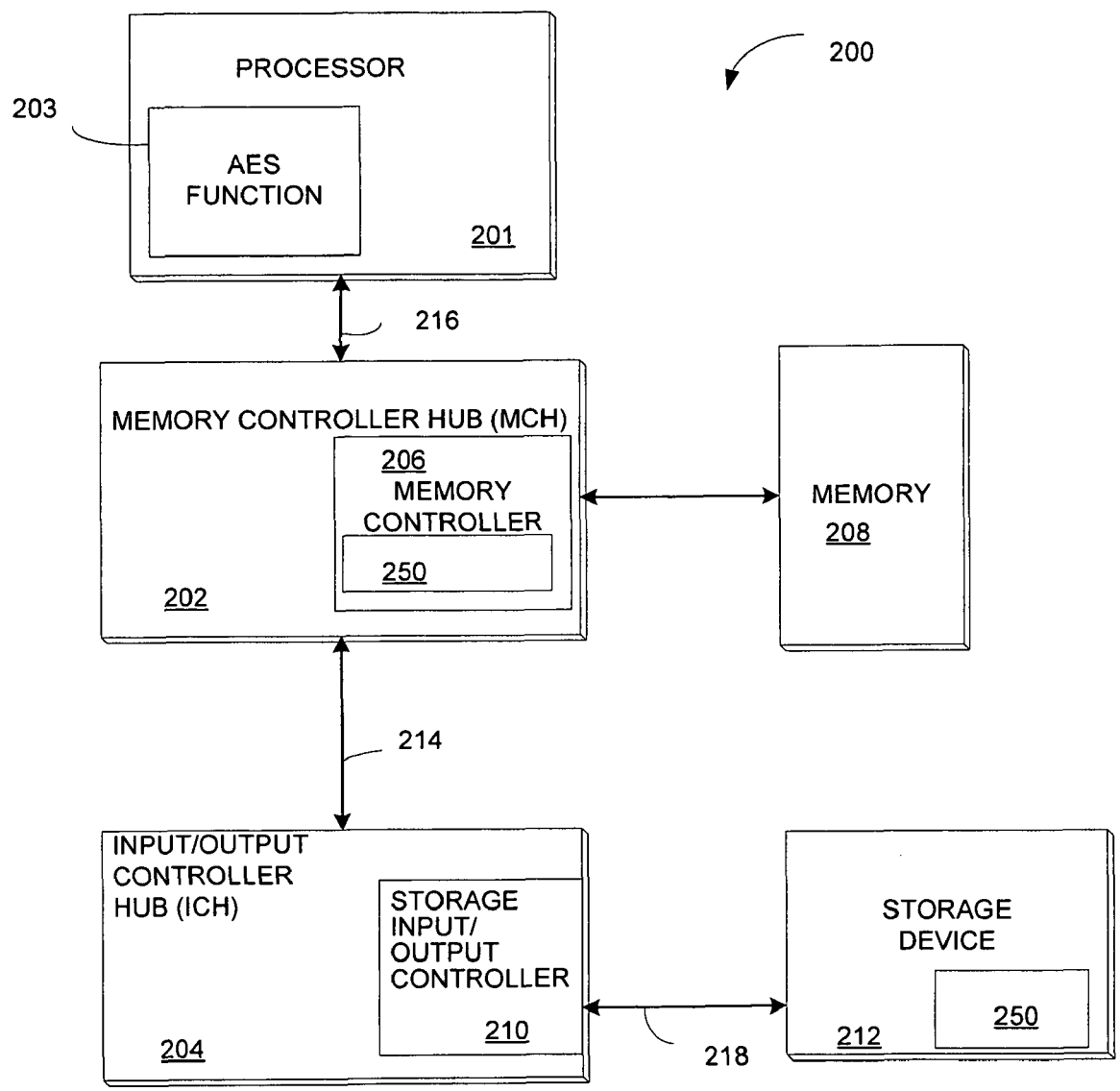
FIG. 2 is a block diagram of a system that includes instructions for performing AES encryption and decryption in a general purpose processor.

FIG. 2 is a block diagram of a system 200 that includes instructions for performing AES encryption and decryption in a general purpose processor. The system 200 includes a processor 201, a Memory Controller Hub (MCH) or (Graphics Memory Controller Hub (GMCH)) 202 and an Input/Output (I/O) Controller Hub (ICH) 204. The MCH 202 includes a memory controller 206 that controls communication between the processor 201 and memory 208. The processor 201 and MCH 202 communicate over a system bus 216.

The processor 201 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor.

The memory 208 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 204 may be coupled to the MCH 202 using a high speed chip-to-chip interconnect 214 such as Direct Media Interface (DMI). DMI supports 2 Gigabit/second concurrent transfer rates via two unidirectional lanes.

The ICH 204 may include a storage I/O controller 210 for controlling communication with at least one storage device 212, for example, Redundant Array of Independent Disks (RAID) 100 (FIG. 1). The ICH 204 may communicate with the storage device 212 over a storage protocol interconnect 218 using a serial storage protocol such as, Serial Attached Small Computer System Interface (SAS) or Serial Advanced Technology Attachment (SATA).

The processor 201 includes an AES function 203 to perform AES encryption and decryption operations. The AES function 203 may be used to encrypt or decrypt information that may be stored in memory 208 and/or stored in the storage device 212.

Encryption (cipher) performs a series of transformations using a secret key (cipher key) to transform intelligible data referred to as "plaintext" into an unintelligible form referred to as "cipher text". The transformations in the cipher include: (1) Adding a round key (value derived from the cipher key) to the state (a two dimensional array of bytes) using a Exclusive OR (XOR) operation; (2) Processing the state using a non-linear byte substitution table (S-Box) (3) Cyclically shifting the last three rows of the state by different offsets; and (4) Taking all of the columns of the state and mixing their data (independently of one another) to produce new columns which may be referred to as a Mix Columns transformation. These four transformations are performed by a single AES instruction which will be described later.

In the Mix Columns transformation, the data from all of the columns of the state is mixed (independently of one another) to produce new columns. Mix Columns is a 128-bit→128-bit transformation operating on the columns of the 4×4 matrix representation of the 128-bit (16-bytes) input. The transformation treats each column as a third degree polynomial with coefficients in AES-Galois Field 256. Each column of the 4×4 matrix representation of the state is multiplied by polynomial $a(x)=\{03\}x^3+\{01\}x^2+\{01\}x+\{02\}$ and reduced modulo $x^4+1$. The 128-bit to 128-bit Mix Columns transformation is a 16 byte to 16 byte transformation. For example, the 16 bytes (State) may be denoted as [p, o, n, m, i, k, j, i, h, g, f, e, d, c, b, a], where a is the least significant byte, and the state has four columns, each column is a 32 bits double word (4 bytes).

The Mix Columns transformation is a matrix multiplication based on GF ($2^8$) arithmetic (modulo $x^8+x^4+x^3+x+1$). Thus, the Mix Columns transformation may be used by a Galois Field Multiplication function 250 to compute the Q syndrome for a level 6 RAID system as discussed below. In order to use the Mix Columns transformation, the Mix Columns transformation is isolated from the AES instruction.

The Mix Columns transformation operates separately on the 4 columns of the state. The four columns are:
(1) [p, o, n, m]

(2) [i, k, j, i]
(3) [h, g, f, e]
(4) [d, c, b, a].

The result of the Mix Columns transformation on [p, o, n, m, i, k, j, i, h, g, f, e, d, c, b, a] is [p', o', n', m', i', k', j', i', h', g', f', e', d', c', b', a'], as shown below in Table 1.

TABLE 1

Column (1) transformation a' = ({02} · a) + ({03} · b) + c + d;
b' = a + ({02} · b) + ({03} · c) + d;
c' = a + b + ({02} · c) + ({03} · d);
d' = ({03} · a) + b + c + ({02} · d)
Column (2) transformation e' = ({02} · e) + ({03} · f) + g + h;
f' = e + ({02} · f) + ({03} · g) + h;
g' = e + f + ({02} · g) + ({03} · h);
h' = ({03} · e) + f + g + ({02} · h)
Column (3) transformation i' = ({02} · i) + ({03} · j) + k + l;
j' = i + ({02} · j) + ({03} · k) + l;
k' = i + j + ({02} · k) + ({03} · l);
l' = ({03} · i) + j + k + ({02} · l)
Column (4) transformation m' = ({02} · m) + ({03} · n) + o + p;
n' = m + ({02} · n) + ({03} · o) + p;
o' = m + n + ({02} · o) + ({03} · p);
p' = ({03} · m) + n + o + ({02} · p)

As shown in Table 1 above, the same operations are performed for each of the four columns.

Thus, assuming that the operations are analogous for each double word (column) a shorthand notation may be used to describe the Mix Columns transformation for one of the four columns (for example, column 4, the least significant double word).

For column 4, the double word (dword)=[d, c, b, a], the Mix Columns transformation in shorthand is denoted as shown below:

d, c, b, a→3a+b+c+2d, a+b+2c+3d, a+2b+3c+d, 2a+3b+c+d

Figure 3:
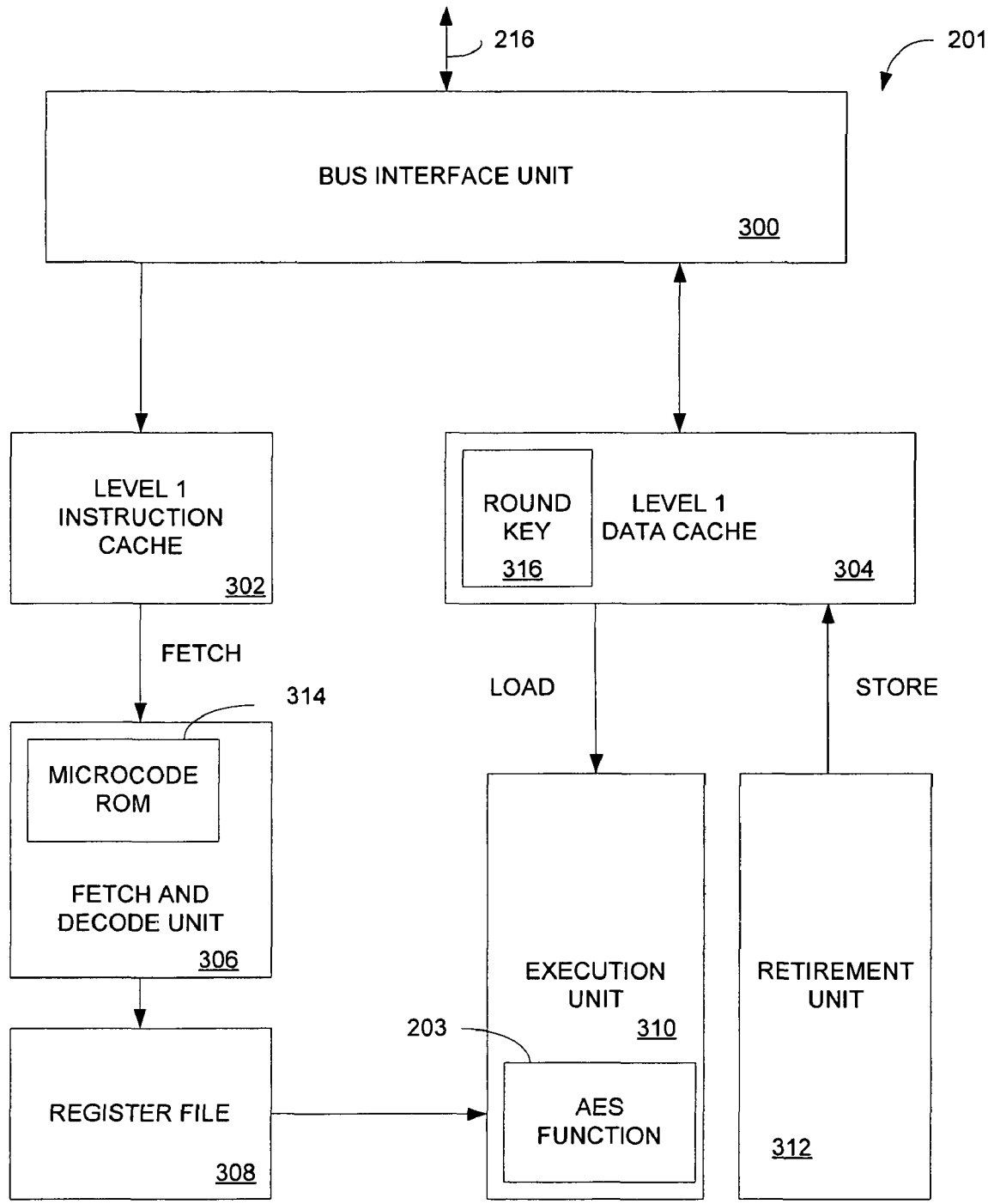
FIG. 3 is a block diagram of an embodiment of the processor shown in FIG. 1.

FIG. 3 is a block diagram of an embodiment of the processor 201 shown in FIG. 2. Processor 201 includes a fetch and decode unit 306 for decoding processor instructions received from a Level 1 (L1) instruction cache 302. Data to be used for executing the processor instructions may be stored in a register file 308. In one embodiment, the register file 308 includes a plurality of 128-bit registers, which are used by an AES instruction to store data for use by the AES instruction.

In one embodiment, the register file 308 is a group of 128-bit registers similar to the 128-bit MMX registers provided in Intel Pentium MMX Processors that have a Streaming (Single Instruction Multiple Data (SIMD)) Extension (SSE) Instruction set. In a SIMD processor, data is processed in 128-bit blocks with one 128-bit block loaded at one time.

The fetch and decode unit 306 fetches macroinstructions from L1 instruction cache 302, decodes the macroinstructions and breaks them into simple operations called micro operations (μops) that may be stored in microcode Read Only Memory (ROM) 314. The execution unit 310, which is pipelined schedules and executes the micro operations. In the embodiment shown, the AES function 203 in the execution unit 310 includes micro operations for AES instructions. The AES instructions are fully pipelined so that the processor (CPU) may dispatch an instruction in every cycle, if there is data ready to process. The retirement unit 312 writes the results of the executed AES instructions to registers or memory. A round key 316 used by an AES instruction may be stored in L1 data cache 304 and loaded into the execution unit 310 for use by the micro operations to execute any one of the AES instructions.

After an AES instruction has been decoded by the fetch and decode unit 306, the execution of an AES instruction by the execution unit 310 involves performing the micro operations associated with the AES instruction that may be stored in the microcode ROM 314.

An AES instruction set includes separate AES instructions for performing an encryption round, a decryption round, an encryption last round and a decryption last round. In an embodiment, each AES instruction has a unique operation code (opcode).

The AES instruction set includes four AES instructions (encrypt, decrypt, encrypt last round, decrypt last round) as shown below in Table 2. The AES instructions in the AES instruction set include single round operations to perform encryption and decryption round operations that are to be used for all rounds but the last round.

TABLE 2

AESENC xmmsrcdst xmm
    Input:    data (=destination), round key
    Output:    data after transformation through the AES round using the round key
    Sequence of Transformations:
        Tmp=Shift Rows (data);
        Tmp=Substitute Bytes (Tmp);
        Tmp=Mix Columns (Tmp);
        Output = Add Round Key(Tmp, round key)
AESENCLAST xmmsrcdst xmm
    Input:    data (=destination), round key
    Output:    data after transformation through the AES last round using the round key
    Sequence of Transformations:
        Tmp=Shift Rows (data);
        Tmp=Substitute Bytes (Tmp);
        Output = Add Round Key(Tmp, round key)
AESDEC xmmsrcdst xmm
    Input:    data (=destination), round key
    Output:    data after transformation through the AES round using the round key
    Sequence of Transformations:
        Tmp=Inverse Shift Rows (data);
        Tmp=Inverse Substitute Bytes (Tmp);
        Tmp=Inverse Mix Columns (Tmp);
        Output = Add Round Key(Tmp, round key)
AESDECLAST xmmsrcdst xmm
    Input:    data (=destination), round key
    Output:    data after transformation through the AES last round using the round key
    Sequence of Transformations:
        Tmp=Inverse Shift Rows (data);
        Tmp=Inverse Substitute Bytes (Tmp);
        Output = Add Round Key(Tmp, round key)

For example, in the AESENC single round instruction in Table 2, the input data is stored in a 128-bit register (xmmsrcdst) and the round key stored in another 128-bit register (xmm). This instruction performs the series of four transformations for one AES encryption round on input data (source) that is stored in the 128-bit xmmsrcdst register and overwrites the input data stored in the 128-bit xmmsrcdst register with the result of the execution of the round operation. Thus xmmsrcdst first stores the input data and later stores the result of the AES round operation.

As shown in Table 2, the corresponding sequences of 128 bits→128 bits transformations are described, using the terminology of FIPS publication 197. The sequence of transformations for an encryption round includes:

(1) An AddRoundKey Transformation: A round key (value derived from the cipher key) is added to the state (a two dimensional 128-bit array of bytes) using an Exclusive OR (XOR) operation. AddRoundKey is a (128-bit, 128-bit)→128-bit transformation which is defined is a bit-wise eXclusive OR (XOR) of its two arguments. In the AES flow, the arguments are the State and the round key.

(2) A SubBytes Transformation: The state is processed using a non-linear byte substitution table (S-Box). SubBytes is the 16 bytes to 16 bytes (byte-wise) transformation defined by applying an S-box transformation to each one of the 16 bytes of an input. The S-box transformation can be represented via a lookup table as follows: The input to the lookup table is a byte B[7:0] where x and y denote low and high nibbles x[3:0]=B[7:4], y[3:0]=B[3:0]. The output byte is encoded in the table as a two digit number in hexadecimal (H) notation. For example, input 85H yields 97H.

(3) A ShiftRows Transformation: The last three rows of the state are cyclically shifted by different offsets. ShiftRows is the following byte-wise permutation: (15, 14, 13, 12, 11, 10, 9, 8, 7, 6, 5, 4, 3, 2, 1, 0)→(11, 6, 1, 12, 7, 2, 13, 8, 3, 14, 9, 4, 15, 10, 5, 0). The transformation is viewed as an operation on a 4×4 matrix representation of the state. The first row in the 4×4 matrix is unchanged. The second row is left rotated by one byte position. The third row is left rotated by two byte positions. The fourth row is left rotated by three byte positions.

(4) Mix Columns Transformation: The data from all of the columns of the state is mixed (independently of one another) to produce new columns. Mix Columns is a 128-bit→128-bit transformation operating on the columns of the 4×4 matrix representation of the 128-bit (16-bytes) input. The transformation treats each column as a third degree polynomial with coefficients in AES-Galois Field 256. Each column of the 4×4 matrix representation of the state is multiplied by polynomial $a(x)=\{03\}x^3+\{01\}x^2+\{01\}+\{02\}$ and reduced modulo $x^4+1$.

As shown in Table 2, the AES last encryption round instruction AESENCLAST does not perform the Mix Columns transformation.

Decryption (inverse cipher) performs a series of transformations using the cipher key to transform the "cipher text" blocks into "plaintext" blocks of the same size. The transformations in the inverse cipher are the inverse of the transformations in the cipher.

The sequence of transformations for a decryption round described above may be performed by a single AES decryption round instruction AESDEC and for a last decryption round by a single AES last decryption round instruction AESDECCLAST as shown above in Table 2.

Combinations of instructions including AES encryption and decryption instructions may be used to obtain the sub-steps (transformations) of the AES algorithm as isolated transformations. The isolated transformations include: Shift Rows, Substitute Bytes and Mix Columns transformations used by the encryption AES instructions (AESENC, AESENCLAST).

An embodiment of the present invention uses the isolated AES Mix Columns transformation obtained using combinations of instructions using AES encryption and decryption instructions to compute the Q-syndrome for level 6 RAID.

Figure 4:
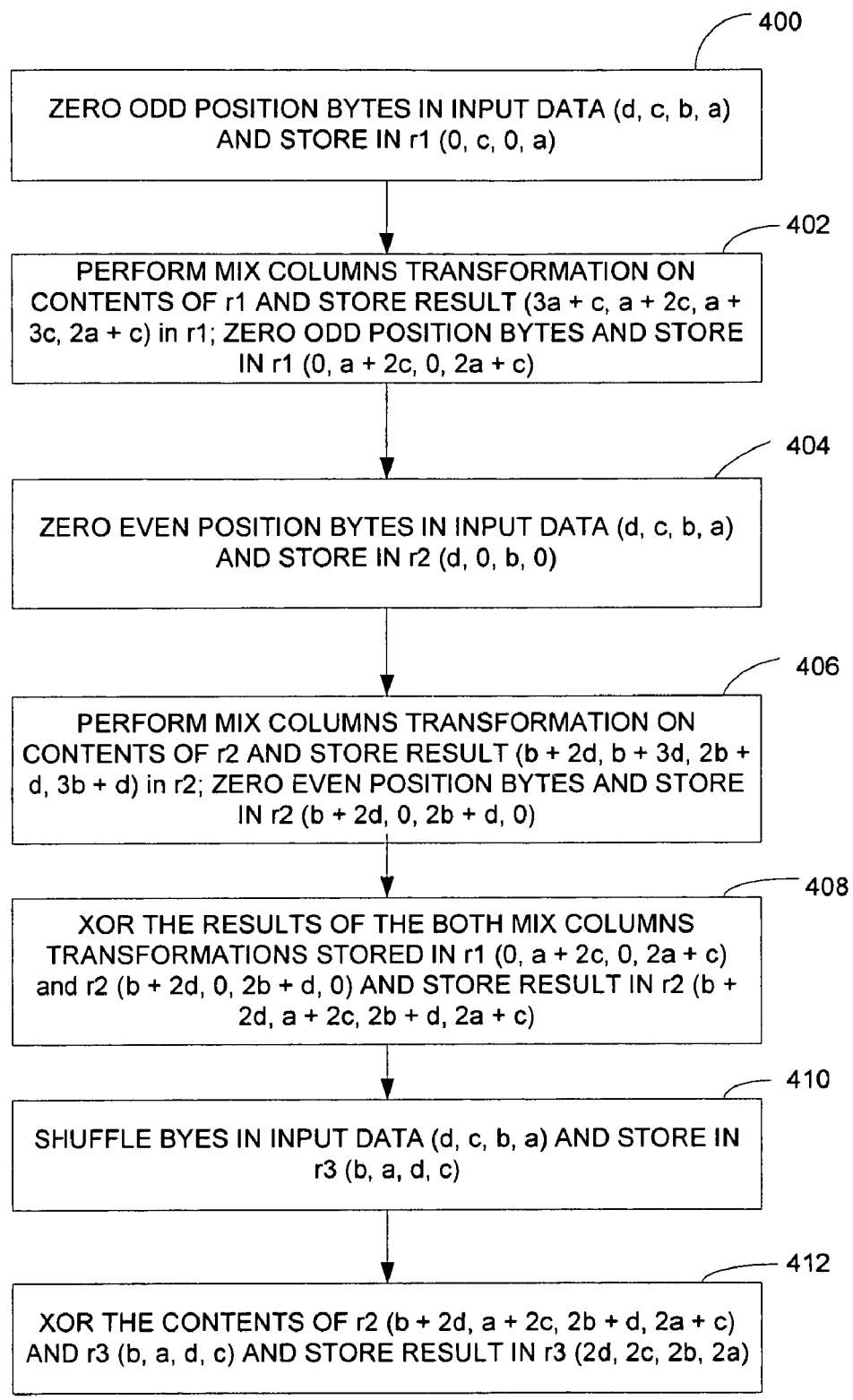
FIG. 4 is a flow chart of an embodiment of a method to perform Galois Field multiplication according to the principles of the present invention.

FIG. 4 is a flow chart of an embodiment of a method to perform Galois Field (GF) multiplication according to the principles of the present invention.

The micro operation for the Mix Columns transformation is used in both the AESENC instruction and the AESDEC instruction. As shown in Table 2, the AESDEC instruction includes the inverse transformations to the transformations in the AESENC instruction. Thus, the micro-operation for the Mix Columns transformation may be isolated by executing the following sequence of instructions: (1) an AESENC instruction with round key set to zero, followed by (2) an AESDECLAST instruction with the round key set to zero.

Referring to the sequence of transformations for each of the AES instructions, this sequence of instructions isolates the Mix Columns transformation because the AddRoundKey micro-operations perform No operations (NOPs), and the other micro-operations (Shift Rows, Substitute Bytes) commute by performing the inverse micro-operations (Inverse Shift Rows, Inverse Substitute Bytes).

Thus, the execution of the sequence of AES instructions (AESENC, AESDECLAST) results in isolating the Mix Columns (State) transformation as shown below:

Y=Inverse Mix Columns (Inverse Substitute Bytes (Inverse Shift Rows (Substitute Bytes (Shift Rows (State))))

The isolated Mix Columns transformation is used to multiply 16 bytes by {02} in the AES Galois Field according to an embodiment of the present invention. An embodiment will be described for multiplying 4 (d, c, b, a) of the 16 bytes (p, o, n, m, l, k, j, i, h, g, f, e, d, c, b, a) by {02}.

In this embodiment the Finite Field is defined by the reduction polynomial 0x11b. In other embodiments, the choice of field representation may be configurable.

Referring to FIG. 4, at block 400, the odd byte positions in the input data (d, c, b, a) are set to zero, that is, b=d=0 to provide (0, c, 0, a). In one embodiment, the Packed Shuffle bytes (PSHUFB) instruction is used to set the odd byte positions to zero.

Figure 5A:
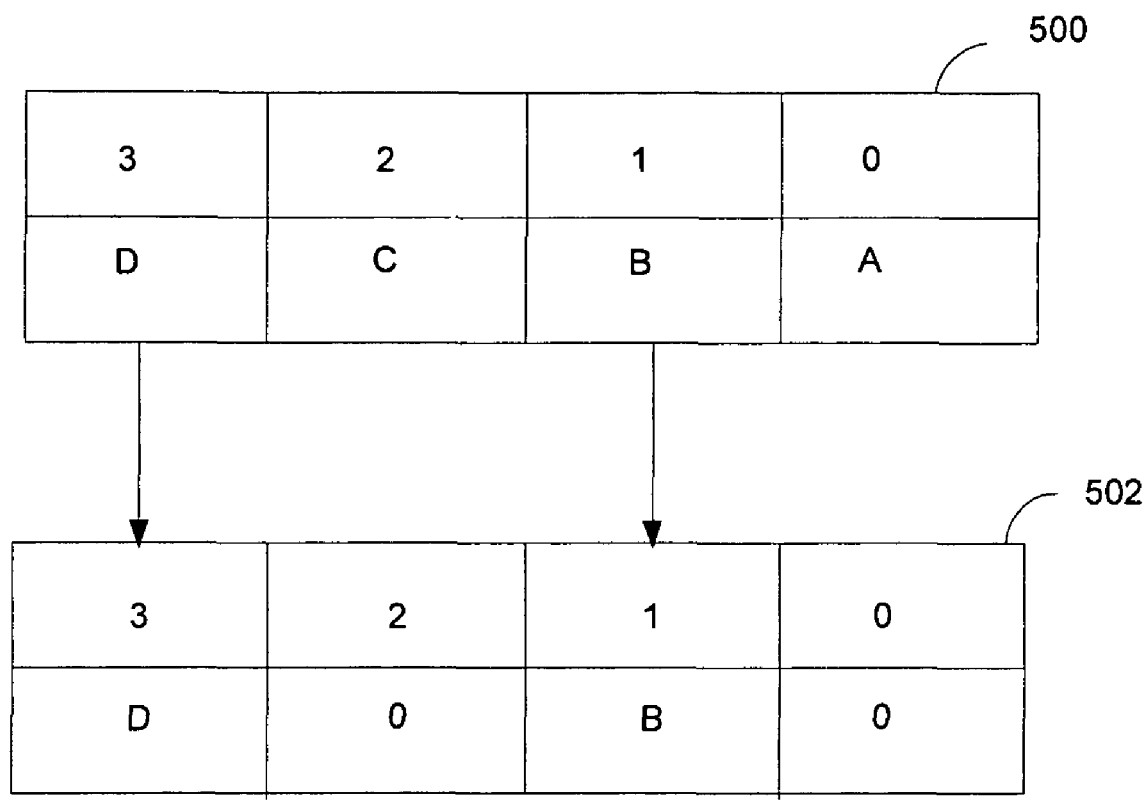
FIGS. 5A-5C illustrate use of a Packed Shuffle bytes (PSHUFB) instruction.
Figure 5B:
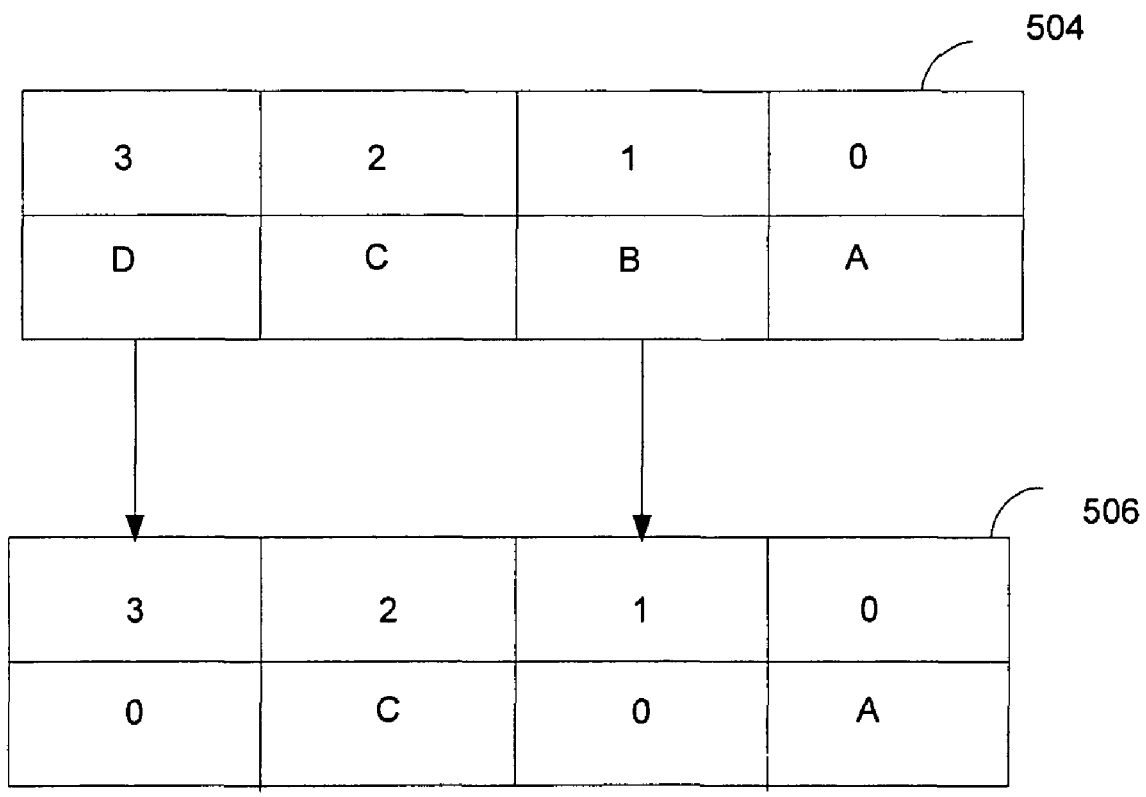
Figure 5C:
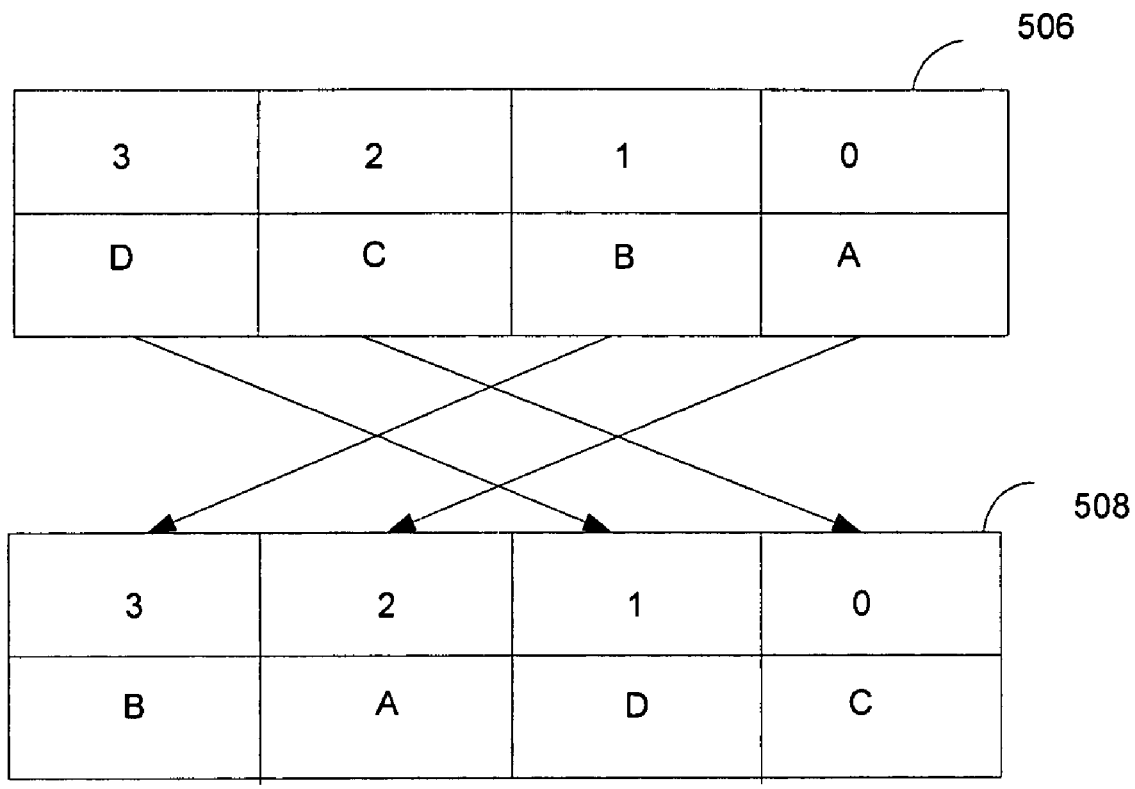

FIGS. 5A-5C illustrate use of a Packed Shuffle bytes (PSHUFB) instruction. The PSHUFB instruction shuffles bytes (performs in-place shuffles of bytes) in a first operand based on the shuffle control mask stored in a second operand. If the Most Significant bit of a byte in the shuffle control mask is set, a zero is written in the corresponding byte in the first operand.

The PSHUFB instruction has two 128-bit inputs that may be referred to as two registers of bytes A and B. The PSHUFB instruction takes two 128-bit registers of bytes $A=[a_{15} a_{14} a_{13} \ldots a_0]$ and $B=[b_{15} b_{14} b_{13} \ldots b_0]$ and replaces register A with $[a_{b15} a_{b14} a_{b13} \ldots a_{b0}]$. If the top bit of $b_i$ is set to 1, the i-th entry of the result is 0.

Referring to FIG. 5A, block 500 illustrates the initial contents of the lower 4-bytes of the 128-bit first register and block 502 illustrates the contents of the lower 4-bytes of the first register after the PSHUFB instruction is executed with shuffle control mask of 'ff02ff00h'. As shown, the two odd bytes (byte 1 and byte 3) have been set to '0' because the MSBs are set to '1'.

Returning to FIG. 4, after the odd bytes have been set to '0', the Mix Columns transformation is performed by performing the sequence of instructions, AESDECLAST followed by AESENC using the contents of the first register. The sequence of instructions performs the transformation:

d, c, b, a→3a+b+c+2d, a+b+2c+3d, a+2b+3c+d, 2a+3b+c+d

As both d and b are zero, the result of the sequence of instructions for 'd=0, c, b=0, a' is:

3a+c, a+2c, a+3c, 2a+c

Next, the odd bytes in the result (3a+c, a+2c, a+3c, 2a+c) are set to zero using the Packed Shuffle Bytes (PSHUFB) instruction and the result of the second PSHUFB instruction (0, a+2c, 0, 2a+c) is stored in the first register.

At block 404, the even byte positions in the input data (d, c, b, a) are set to zero, that is, a=c=0 to provide (d, 0, b, 0). In one embodiment, the Packed Shuffle bytes (PSHUFB) instruction is used to set the even byte positions to zero.

Referring to FIG. 5B, 502 illustrates the initial contents of the first register and 504 illustrates the contents of the first register after the PSHUFB instruction is executed with shuffle control mask of '03ff01ffh'. As shown, all even byte positions have been set to '0'.

Returning to FIG. 4, after the even byte positions have been set to '0', the Mix Columns transformation is performed by performing the sequence of instructions, AESDECLAST followed by AESENC using the contents of the first register. The sequence of instructions performs the transformation:

d, c, b, a→3a+b+c+2d, a+b+2c+3d, a+2b+3c+d, 2a+3b+c+d

As both c and a are zero, the result of the sequence of instructions for 'd, c=0, b, a=0' is: b+2d, b+3d, 2b+d, 3b+d Next, the even bytes in the result (b+2d, b+3d, 2b+d, 3b+d) are set to zero using the Packed Shuffle bytes (PSHUFB) instruction and the result of the fourth PSHUFB instruction (b+2d, 0, 2b+d, 0) is stored in the second register.

At block 408, the result stored in the first register (block 402) and the result stored in the second register (block 406) are XORed to provide the result (b+2d, a+2c, 2b+d, 2a+c) of both Mix Column transformations. In an embodiment, the results are XORed using a PXOR instruction. The PXOR instruction performs an XOR operation on the contents of two registers and stores the result in one of the registers.

At block 410, the Packed Shuffle bytes (PSHUFB) instruction is used to shuffle bytes in the input data (d, c, b, a) based on a mask.

Referring to FIG. 5C, 506 illustrates the initial contents of the third register and 508 illustrates the contents of the third register after the PSHUFB instruction is executed with shuffle control mask of '000302h'. As shown, bytes in input data (d, c, b, a) are shuffled to provide result (b, a, d, c) 510 which is stored in the third register.

Continuing with FIG. 4, at block 412, an XOR operation is performed on the contents of register 3 (b+2d, b+3d, 2b+d, 3b+d) and register 2 (b, a, d, c) to provide the result of the multiply operation, that is, (2d, 2c, 2b, 2a).

An embodiment has been described to perform multiplication by g={02} on a 4-byte data block. Table 4 below illustrates a Code sample (assembler) for a functionally correct non-optimized embodiment operating on one 16 byte data block.

TABLE 4

| | |
|---|---|
| data_ | do 07b5b54657374566563746f725d53475dh; |
| zero_ | do 00000000000000000000000000000000h; |
| mask1 | do 0ff0eff0cff0aff08ff06ff04ff02ff00h |
| mask2 | do 00fff0dff0bff09ff07ff05ff03ff01ffh |
| mask3 | do 00d0c0f0e09080b0a0504070601000302h |
| | movdqu xmm4, OWORD PTR data_ |
| | movdqu xmm1, xmm3 |
| | PSHUFB xmm1, mask1 |
| | AESDECLAST xmm1, zero_ ; AES instructions with round key = 0 |
| | AESENC xmm1, zero_ |
| | PSHUFB xmm1, mask1 ; passing again via mask1 |
| | movdqu xmm2, xmm4 |
| | PSHUFB xmm2, mask2 |
| | AESDECLAST xmm2, zero_ |
| | AESENC xmm2, zero_ |
| | PSHUFB xmm2, mask2 |
| | PXOR xmm2, xmm1 ; xmm2 = xmm1 xor xmm2 |
| | PSHUFB xmm3, mask3 ; shuffling xmm0 (the original data) with mask3 |

TABLE 4-continued

| | |
|---|---|
| PXOR xmm3, xmm2 | ; xmm0 = xmm0 xor xmm2 |
| | ; xmm3 holds the result |

As shown in the code sample in Table 4, Galois Field multiplication is performed on 16 bytes of_data using 11 instructions (5 PSHUFB instructions, 2 PXOR instructions, 2 AESENC instructions, 2 AESDECLAST instructions), 3 masks (mask1, mask2, mask3) and three xmm registers (xmm1, xmm2, xmm3).

For example, the result of performing Galois Field multiplication on
input data:'e598271ef11141b8ae52b4e0355dbfd4' results in
output data: 'd12b4e3cf922826b47a473db60ba65b3'.

In this code sample, if the instructions are processed serially, the throughput is slow due to latency of the AES instruction. For example, in an embodiment, latency of PSHUFB and PXOR instructions is 1 cycle and latency of AES instructions is 6 cycles. Thus, there is a 12 cycle latency if the pair of AES instructions are processed serially. In other embodiments, overall latency may be decreased by concurrently processing a plurality of 16 bytes of input data with instructions interleaved so that the second AES instruction in the pair of AES instructions is scheduled 6 cycles after the first AES instruction in the pair of AES instructions is scheduled. The order of instructions in the sample code shown in Table 4 may be changed, as illustrated in the example shown in FIGS. 6A-6C. This order of instructions allows several 16 byte data blocks to be processed concurrently because the latency of the AES instructions is greater than the latency of the PXOR and PSHUFB instructions.

FIGS. 6A-6C is sample code that allows Galois Field multiplication to be performed concurrently on a plurality of 16 byte data blocks. This code is merely one example of code that may be used. There may be many other variants, for example, code may be optimized for use with a particular compiler. FIGS. 6A-6C shows a function (inline assembler) that performs multiplication by {02} on a data buffer of NBLOCKS data blocks (each block having 16 bytes (16B)). Four 16-byte blocks are processed in parallel and the operation (4 16-byte blocks in parallel) is repeated (4 blocks in parallel) 4 times to consume the 256 byte data buffer. Twelve xmm registers (xmm0-xmm11) are used to store input data and the result of operations on the input data. Three mask registers (mask1, mask2, mask3) store the same masks as the sample code shown in Table 4. Referring to FIG. 6A, the instructions in block 600 set the odd byte positions in the input data stored in xmm registers (xmm1, xmm4, xmm7, xmm10) to zero. In the example shown, the Packed Shuffle bytes (VPSHUFB) instruction is used to set the odd byte positions to zero. The VPSHUFB instruction performs a move, followed by a PSHUFB, for example, for the instruction "vpshufb xmm1, xmm0, mask1", xmm0 contents are moved to xmm1, then the contents of xmm1 are shuffled based on the control mask stored in xmm0.

Next, the AESDECLAST instructions in block 602 operate on the input data with odd byte positions set to zero stored in the xmm1, xmm4, xmm7, and xmm10 registers.

The instructions in block 604 move the input data to xmm registers (xmm2, xmm5) and set odd byte positions to zero and reshuffle the input bytes in xmm registers (xmm0, xmm3) as discussed in conjunction with FIG. 5C.

Referring to FIG. 6B, the AESENC instructions in block 606 isolate the MixColumns transformation and store the result in the xmm registers (xmm1, xmm3, xmm7, xmm10).

The instructions in block 608 move the input data to xmm registers (xmm8, xmm11) and set even byte positions to zero and reshuffle the input bytes in xmm registers (xmm6, xmm9) as discussed in conjunction with FIG. 5C.

The instructions in block 610 perform an AESDECLAST instruction on the input data with even byte positions set to zero stored in xmm registers (xmm2, xmm5, xmm8, xmm11).

The instructions in block 612, zero the odd position bytes in the data stored in xmm registers (xmm1, xmm4, xmm7, xmm10).

The instructions in block 614, perform an AESENC instruction on the data stored in xmm registers (xmm2, xmm5, xmm8, xmm11) and set the even byte positions to zero in the result stored in xmm registers (xmm2, xmm5, xmm8, xmm11).

The instructions in block 616 perform XOR operations on the contents of xmm registers (xmm0-xmm11) to provide the result of the multiply operation in xmm registers (xmm0, xmm3, xmm6, xmm9).

The instructions in block 618 move the result of the of the multiply operation stored in xmm registers (xmm0, xmm3, xmm6, xmm9) to the rbx register.

The instructions in block 620 compute a pointer to the location of the next 16 byte block to be multiplied.

In another embodiment, where the RAID-6 computations are carried out in another representation of $GF(2^8)$, it is possible to use the described technique by converting the inputs to the "preferred" representation (with reduction polynomial 11B) where the AES instructions can be applied. A final conversion to the original representation is needed (but can be deferred to the case where recovery is indeed required). The conversion can be done using a pre-computed table.

Alternative embodiments of the invention also include machine-accessible media containing instructions for performing the operations of the invention. Such embodiments may also be referred to as program products. Such machine-accessible media may include, without limitation, storage media such as floppy disks, hard disks, Compact Disk-Read Only Memories (CD-ROMSs), Read Only Memory (ROM), and Random Access Memory (RAM), and other tangible arrangements of particles manufactured or formed by a machine or device. Instructions may also be used in a distributed environment, and may be stored locally and/or remotely for access by single or multi-processor machines.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. A method of encrypting a plaintext comprising:
performing a Galois Field multiplication operation in parallel on each of a plurality of bytes in a block of bytes, comprising:
performing an Advanced Encryption Standard (AES) Mix Columns transformation on the block of bytes having all even position bytes set to zero to provide a first result;
performing the AES Mix Columns transformation on the block of bytes having all odd position bytes set to zero, to provide a second result; and
combining the first result and the second result to provide the result of the Galois Field multiplication operation.

2. The method of claim 1, wherein a finite field in the Galois Field multiplication operation is defined by the reduction polynomial 0x11B.

3. The method of claim 1, wherein performing the AES Mix Columns transformation comprises:
executing an AESDECLAST round instruction followed by an AESENC round instruction.

4. The method of claim 3, wherein the series of transformations performed by the AESDECLAST round instruction includes an Inverse Shift Rows transformation and an Inverse Substitute Bytes transformation and the series of transformations performed by the AESENC round instruction includes a Shift Rows transformation, a Substitute Bytes transformation and a Mix Columns transformation.

5. The method of claim 1, wherein combining further comprises:
performing an Exclusive OR (XOR) operation on the first result and the second result to provide a third result;
shuffling the data stored in the block of bytes to switch the low order two bytes and the high order two bytes of each four byte block in the block of bytes to provide a fourth result; and
performing an XOR operation on the third result and the fourth result.

6. The method of claim 1, wherein the AES Mix Columns transformation transforms a four byte block sequence d, c, b, a to another four byte block sequence 3a+b+c+2d, a+b+2c+3d, a+2b+3c+d, 2a+3b+c+d.

7. The method of claim 1, wherein the combination is used to compute the Q syndrome for a level 6 RAID system.

8. An encryption apparatus comprising;
memory storing a plurality of instructions to perform a Galois Field multiplication operation in parallel on each of a plurality of bytes in a block of bytes; and
a processor including an execution unit,
the instructions stored in an order in the memory such that when executed by the execution unit, the execution unit to perform an Advanced Encryption Standard (AES) Mix Columns transformation on the block of bytes having all even position bytes set to zero to provide a first result, perform the AES Mix Columns transformation on the block of bytes having all odd position bytes set to zero, to provide a second result and to combine the first result and the second result to provide the result of the Galois Field multiplication operation.

9. The apparatus of claim 8, wherein a finite field in the Galois Field multiplication operation is defined by the reduction polynomial 0x11B.

10. The apparatus of claim 8, wherein the execution unit to perform the AES Mix Columns transformation by executing an AESDECLAST round instruction followed by an AESENC round instruction.

11. The apparatus of claim 10, wherein the series of transformations performed by the AESDECLAST round instruction includes an Inverse Shift Rows transformation and an Inverse Substitute Bytes transformation and the series of transformations performed by the AESENC round instruction includes a Shift Rows transformation, a Substitute Bytes transformation and a Mix Columns transformation.

12. The apparatus of claim 8, wherein the AES Mix Columns transformation transforms a four byte block sequence d, c, b, a to another four byte block sequence 3a+b+c+2d, a+b+2c+3d, a+2b+3c+d, 2a+3b+c+d.

13. The apparatus of claim 8, wherein the combination is used to compute the Q syndrome for a level 6 RAID system.

14. An article including a non-transitory machine-accessible medium having associated information, wherein the information, when accessed, results in a machine performing the following data encryption steps:

performing a Galois Field multiplication operation in parallel on each of a plurality of bytes in a block of bytes, comprising: performing an Advanced Encryption Standard (AES) Mix Columns transformation on the block of bytes having all even position bytes set to zero to provide a first result;

performing the AES Mix Columns transformation on the block of bytes having all odd position bytes set to zero, to provide a second result; and combining the first result and the second result to provide the result of the Galois Field multiplication operation.

15. The article of claim 14, wherein a finite field in the Galois Field multiplication operation is defined by the reduction polynomial 0x11B.

16. The article of claim 14, wherein performing the AES Mix Columns transformation comprises:

executing an AESDECLAST round instruction followed by an AESENC round instruction.

17. The article of claim 14, wherein the series of transformations performed by the AESDECLAST round instruction includes an Inverse Shift Rows transformation and an Inverse Substitute Bytes transformation and the series of transformations performed by the AESENC round instruction includes a Shift Rows transformation, a Substitute Bytes transformation and a Mix Columns transformation.

18. An encryption system comprising:

a processor; and a storage device accessible by the processor and having stored therein a plurality of instructions, at least one of the instructions to perform a sequence of transformations, the instructions combined in an order such that when executed by the processor, causes the processor to at least, perform an Advanced Encryption Standard (AES) Mix Columns transformation on a block of bytes having all even position bytes set to zero to provide a first result; perform the AES Mix Columns transformation on the block of bytes having all odd position bytes set to zero, to provide a second result; and combine the first result and the second result to provide the result of a Galois Field multiplication operation on each of a plurality of bytes in the block of bytes in data encryption process.

19. The system of claim 18, wherein a finite field in the Galois Field multiplication operation is defined by the reduction polynomial 0x11B.

20. The system of claim 18, wherein an AESDECLAST round instruction followed by an AESENC round instruction performs the AES Mix Columns transformation.

* * * * *